United States Patent
Schulz et al.

(10) Patent No.: US 8,991,435 B2
(45) Date of Patent: Mar. 31, 2015

(54) CLOSING DEVICE

(75) Inventors: Christian Schulz, Reidstadt (DE); Christoph Voss, Frankfurt (DE); Ulrich Zutt, Niedernhausen (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 765 days.

(21) Appl. No.: 13/126,566

(22) PCT Filed: Oct. 30, 2009

(86) PCT No.: PCT/EP2009/064336
§ 371 (c)(1),
(2), (4) Date: Apr. 28, 2011

(87) PCT Pub. No.: WO2010/054936
PCT Pub. Date: May 20, 2010

(65) Prior Publication Data
US 2011/0203693 A1    Aug. 25, 2011

(30) Foreign Application Priority Data

Nov. 12, 2008 (DE) .......................... 10 2008 056 853

(51) Int. Cl.
*F16L 55/10* (2006.01)
*F16L 55/11* (2006.01)

(52) U.S. Cl.
CPC ...................................... *F16L 55/11* (2013.01)
USPC ............ 138/89; 29/505; 29/520; 29/890.126; 72/325

(58) Field of Classification Search
USPC ........... 138/89, 90; 29/505, 515, 520, 888.41, 29/888.44, 509, 511, 522.1, 890.13, 29/890.126; 137/15.17; 72/325
See application file for complete search history.

(56) References Cited

U.S. PATENT DOCUMENTS

| | | | | |
|---|---|---|---|---|
| 3,374,014 | A * | 3/1968 | Kull et al. | 403/332 |
| 4,425,699 | A * | 1/1984 | Nordin | 29/505 |
| 4,722,619 | A * | 2/1988 | Reiser et al. | 384/585 |
| 6,203,117 | B1 | 3/2001 | Starr et al. | |
| 6,244,295 | B1 | 6/2001 | Bartussek et al. | |
| 6,508,520 | B2 * | 1/2003 | Sampson et al. | 303/113.1 |
| 6,851,659 | B2 * | 2/2005 | Zutt et al. | 251/359 |
| 7,231,797 | B2 * | 6/2007 | Rispler | 72/325 |
| 8,171,961 | B2 * | 5/2012 | Koyama | 138/89 |
| 2003/0029219 | A1 | 2/2003 | Rispler | |
| 2004/0021537 | A1 | 2/2004 | Zutt et al. | |
| 2008/0093915 | A1 | 4/2008 | Ota et al. | |
| 2008/0185548 | A1 | 8/2008 | Takahashi et al. | |
| 2012/0262033 | A1 * | 10/2012 | Yasuda et al. | 310/68 B |

FOREIGN PATENT DOCUMENTS

| | | | |
|---|---|---|---|
| DE | 3203439 A1 | 8/1983 | |
| DE | 4030571 A1 | 4/1992 | |

(Continued)

*Primary Examiner* — Kevin P Shaver
*Assistant Examiner* — Robert Nichols, II
(74) *Attorney, Agent, or Firm* — Brinks Gilson & Lione

(57) ABSTRACT

A closing device, particularly for closing channels conducting pressure medium in a valve receiving body, has a rotationally symmetrical closing element (6) that is fastened in a seating bore (1) of a housing (14), having a calking site (2) that is provided on the circumference of the closing element (6) and that permanently fixes the closing element (6) in the housing (14) as a result of the plastic displacement of housing material. The seating bore (1) includes a transition area in the form of a bore step (4) between the calking site (2) and a centering cone surface (3). The bore step is recessed into the seating bore (1) by the plastic displacement of the housing material in the form of a bulge surrounding the closing element (6).

20 Claims, 2 Drawing Sheets

(56) References Cited

FOREIGN PATENT DOCUMENTS

| DE | 4330616 | A1 | 3/1994 |
| DE | 4439059 | A1 | 5/1996 |
| DE | 19741562 | A1 | 3/1999 |
| DE | 19837207 | A1 | 9/1999 |
| DE | 10044897 | A1 | 3/2002 |
| DE | 10102593 | A1 | 5/2002 |
| DE | 102006037694 | A1 | 2/2008 |
| JP | 2008155674 | A | 7/2008 |

* cited by examiner

CLOSING DEVICE

TECHNICAL FIELD OF THE INVENTION

The invention relates to a closing device, particularly for closing fluid-carrying ducts in a housing. The invention also relates to a method for fixing a closing element in a housing.

BACKGROUND OF THE INVENTION

A closing device, which comprises a closing element pressed into the seating bore of a housing, has already been disclosed by DE 44 39 059 A1. The closing element assumes the function of a calking punch, so that it has to be made correspondingly solid and extremely precise in terms of its surface contour, in order on the one hand to transmit the high inward pressing force acting on the housing and on the other to ensure the required tightness of the closing element in the seating bore on completion of the calking operation.

The object of the present invention, therefore, is to improve a closing device of the aforementioned type in such a way that said disadvantages are avoided, in order to allow a closing element of the simplest possible construction to be fixed in the seating bore of a housing whilst applying the minimum possible force by means of a comparatively simple and yet reliable fluid-tight calking operation.

This object is achieved, for a closing device manufactured by applying a calking punch to a centering cone face at an outer edge of a seating bore, self-centering the calking punch on the centering cone face for a concentric alignment of the calking punch in the direction of the seating bore, penetrating the calking punch into the housing material and displacing the housing material towards a flange provided on the circumference of the closing element, and terminating the feeding movement of the calking punch in the direction of the seating bore when a defined calking force or a structurally defined limit position of the calking punch in the seating bore is reached.

BRIEF DESCRIPTION OF THE DRAWINGS

Further features and advantages are set forth below in the description of several drawings, of which.

DETAILED DESCRIPTION OF THE DRAWINGS

Figure 1:
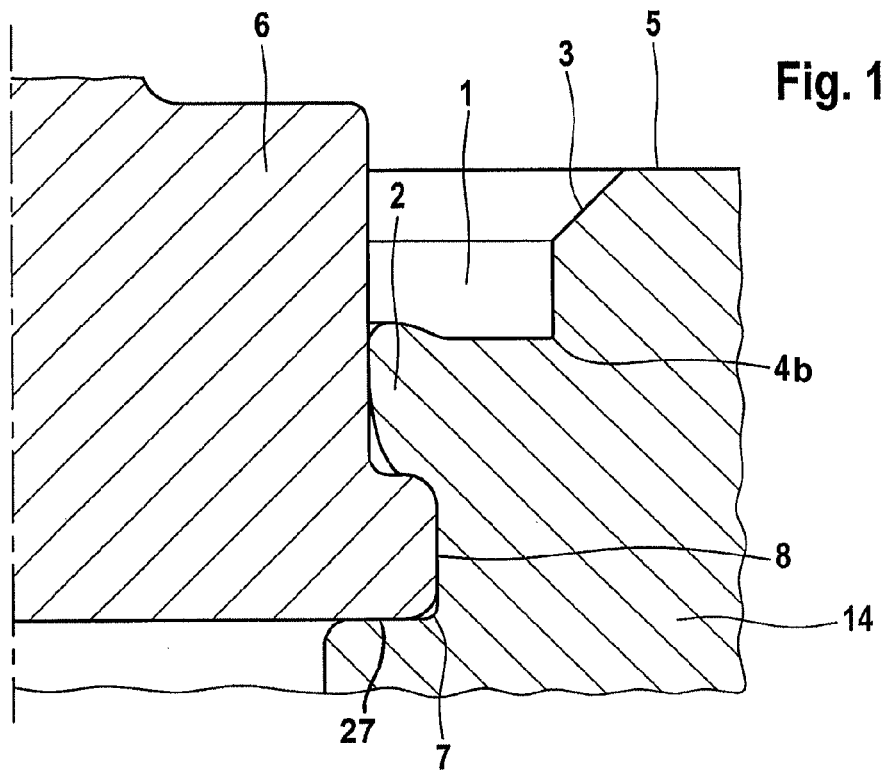
FIG. 1 shows a partial view of a fully calked closing device having the features essential for the invention.

To an enlarged scale and in longitudinal section, FIG. 1 shows a partial view of a closing device for closing cavities, in particular fluid-carrying ducts in a housing 14, comprising a rotationally symmetrical closing element 6, which is fixed in a seating bore 1 of the block-shaped housing 14. A calking site 2, which due to the plastic displacement of the housing material permanently fixes the closing element 6 in the housing 14, is provided on the circumference of the closing element 6 for fixing and sealing it in the housing 14. For fixing purposes the seating bore 1, between the calking site 2 and a centering cone face 3, comprises a transitional area in the form of a bore step 4 (illustrated as a pre-deformed first bore step 4a in FIG. 2 and a deformed first bore step 4b in FIG. 1), which is significantly deepened, compared to the original state of the housing 14 shown in FIG. 2, by the plastic displacement of the housing material into the seating bore 1. The centering cone face 3, as a funnel-shaped chamfer, is directly contiguous with an outer edge 5 of the seating bore 1, and to form the calking site 2 is also plastically deformed in portions in the direction of the deformed first bore step 4b by a calking punch 9.

In order to absorb a calking force generated by the calking punch 9 on a reaction face 27 running transversely to the seating bore 1, the closing element 6 is correspondingly supported in the seating bore 1, for which purpose a further bore step 7 is provided in the seating bore 1 at an axial interval from the pre-deformed first bore step 4a, so that the seating bore 1 has a diameter diminishing with increasing depth. For supporting and fixing in the seating bore 1, the closing element 6 comprises a flange 8, which between the further bore step 7 and the calking site 2 is positively and/or non-positively enclosed by the displaced housing material.

The calking site 2 is therefore formed on the flange 8 of the closing element 6 as a circumferential bead, which due to the plastic displacement of the housing material onto the closing element 6 is formed adjoining the deformed first bore step 4b in the seating bore 1. Here the bead is formed by the contour of the sleeve-shaped calking punch 9, which allows the displacement of the housing material defining the seating bore 1 towards the flange 8.

Figure 2:
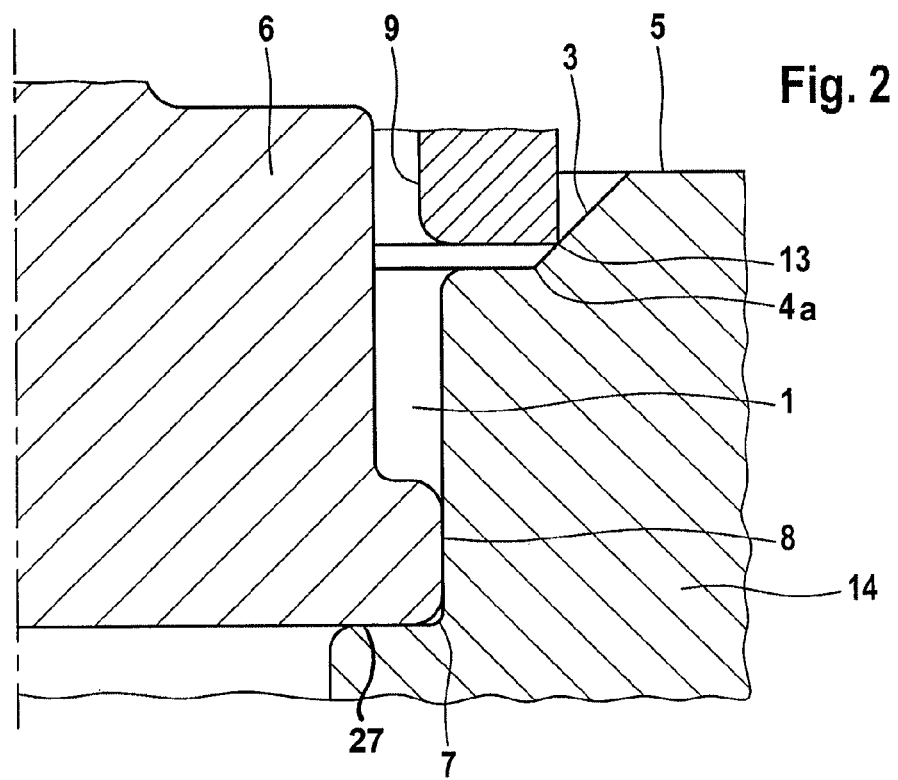
FIG. 2 shows the closing device according to FIG. 1 prior to the plastic deformation of the housing material towards the closing element with a calking punch arranged so that it is self-centering on a centering cone face of the housing.

FIG. 2, to an enlarged scale like FIG. 1, shows a partial view of the closing device in longitudinal section, with the closing element 6 inserted in the seating bore 1, prior to the calking of the housing material towards the flange 8, which initially rests loosely on the further bore step 7, formed below the pre-deformed first bore step 4a in the seating bore 1, before the housing material situated between the centering cone face 3 and the further bore step 7 is plastically displaced by the sleeve-shaped calking punch 9 towards the flange 8 and into the annular space in the seating bore 1 defined between the closing element 6 and the housing 14, in order to form the calking site 2 disclosed in FIG. 1.

For this purpose the calking punch 9 in the form of a flat punch is first applied with the cutting edge 13 to the centering cone face above the pre-deformed first bore step 4a, so that in eccentrically feeding the calking punch 9 the cutting edge 13 first slides with self-centering effect on the centering cone face 3, before pressing into the seating bore 1. After concentric alignment on the centering cone face 3, the force is increased in order to force the cutting edge 13 formed on the outer circumference of the calking punch 9 into the housing material and to displace the housing material towards the flange 8 provided on the circumference of the closing element 3, with the unusual feature that, owing to the cutting action of the cutting edge 13 in the centering cone face 3, the centering cone face 3 is also first plastically deformed in portions into the seating bore 1, until the sleeve-shaped calking punch 9 with its entire annular face encounters the annular face of the pre-deformed first bore step 4a, and with the full bearing face of the calking punch 9 plastically displaces the housing material, situated in the transitional area between the two bore steps 4, 7, further towards the flange 8.

Figure 3:
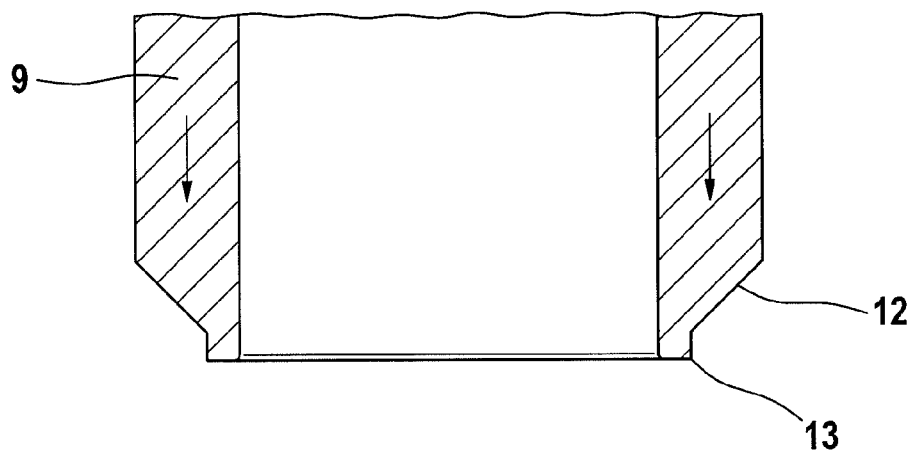
FIG. 3 shows a longitudinal section through a preferred embodiment of the closing element as valve sleeve for the seating of components of a solenoid valve drive mechanism.
Figure 3:
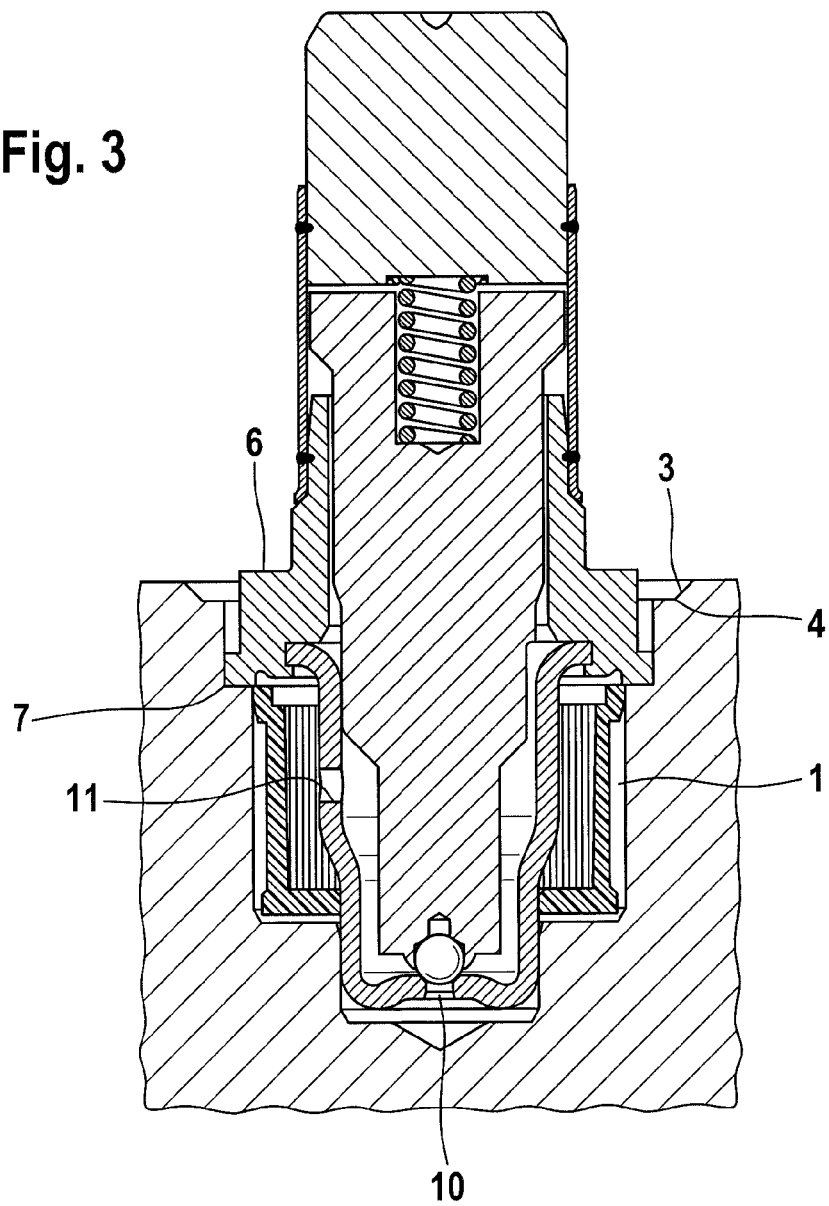

The constant feed movement of the calking punch 9 in the direction of the seating bore 1 is terminated on reaching the limit position of the calking punch 9 in the seating bore 1, for which purpose a limit stop 12, which on reaching the limit position of the calking punch 9 bears against the centering cone face 3, is provided on the calking punch 9, as represented according to FIG. 3.

The automatic concentric alignment of the calking punch 9 and the ensuing cutting process serve to reduce the force expended for the calking tool, so that the risk of inadmissible deformation of the housing material in adjacent areas of the housing 14 is also advantageously avoided.

FIG. 3 in a longitudinal section shows a preferred embodiment of the closing element 6 as valve sleeve for the seating of components of a solenoid valve drive mechanism. For this purpose, in its lower part the two-part closing element 6 comprises inlet and outlet apertures 10, 11 running transversely and longitudinally, which are preferably produced by punching or stamping. In this exemplary embodiment the lower part of the closing element 6 is produced at particularly low cost by deep-drawing thin sheet metal, and the upper part is produced from a steel blank by cold upsetting or extrusion. FIG. 3 furthermore shows the calking punch 9, already partially represented in FIG. 2, above the valve sleeve prior to the calking. At an axial interval from the cutting edge 13 a face, extended conically upwards, is formed on the circumference of the calking punch 9, said face constituting the limit stop 12, which, on conclusion of the continuous inward pressing process, on reaching the limit position of the calking punch 9 in the seating bore 1 bears against the centering cone face 3.

The invention claimed is:

1. A closing device for closing fluid-carrying ducts in a housing, comprising:
   a housing with a surface and a seating bore penetrating the surface, the seating bore having a first bore step in a pre-deformed condition of the housing disposed axially away from the surface, the seating bore further having a centering cone face extending from the first bore step in the pre-deformed condition to the surface, the seating bore further having a second bore step defining a reaction face disposed at an axial distance from the surface, wherein the first bore step is disposed axially between the surface and the reaction face, and wherein the seating bore has a diameter diminishing with increased depth from the surface, and
   a rotationally symmetrical closing element abutting the reaction face in the pre-deformed condition, and
   a caulking site being formed on the circumference of the closing element by a plastic deformation of the housing caused by an axial force exerted on the first bore step, the axial force dimensioned to plastically deform the first bore step closer to the second bore step and to radially displace housing material toward the closing element.

2. The closing device as claimed in claim 1, further comprising that by forming the calking site, the centering cone face is also plastically deformed in portions in the direction of the first bore step.

3. The closing device as claimed in claim 1, further comprising that the centering cone face, as a funnel-shaped chamfer, is formed directly on an outer edge of the seating bore.

4. The closing device as claimed in claim 1, further comprising that the reaction face runs transversely to the seating bore.

5. The closing device as claimed in claim 1, further comprising that the closing element has a flange abutting the reaction face.

6. The closing device as claimed in claim 1, further comprising that the calking site is formed on a flange of the closing element as a circumferential bead adjoining the first bore step in the deformed condition in the seating bore, and housing material displaced toward the flange to form the circumferential bead is displaced into an annular space in the seating bore defined between the closing element and the housing in order to form the calking site.

7. The closing device as claimed in claim 6, further comprising that the bead is formed by the contour of a sleeve-shaped calking punch.

8. The closing device as claimed in claim 1, further comprising that the closing element is embodied as a valve sleeve for the seating of components of a solenoid valve drive mechanism.

9. The closing device as claimed in claim 8, further comprising that the closing element includes inlet and outlet apertures running transversely and longitudinally.

10. The closing device as claimed in claim 1, further comprising that the closing element is made of deep-drawn thin sheet metal.

11. The closing device as claimed in claim 1, further comprising that the closing element is made from a steel blank by cold upsetting or extrusion.

12. The closing device as claimed in claim 1, further comprising a calking punch including a limit stop with a conical face that bears against the centering cone face at a limit position that terminates movement of the calking punch in the direction of the seating bore.

13. A method for fixing a closing element in a housing with a surface, having a rotationally symmetrical closing element, which is inserted in a seating bore that penetrates the surface of the housing, the closing element having a flange, which is provided on the circumference of the closing element and which bears against a reaction face of the seating bore in a pre-deformed condition of the housing, wherein the reaction face is a distance from the surface, the method comprising the steps of:
   applying a calking punch to a centering cone face at an outer edge of the seating bore,
   self-centering the calking punch on the centering cone face into concentric alignment with the seating bore,
   pressing the calking punch into a first bore step of the housing material, wherein the first bore step is axially between the reaction face and the surface in the pre-deformed condition of the housing, and
   displacing housing material towards the closing member, securing the flange of the closing element in the seating bore,
   stopping to displace housing material when at least one of the following conditions is met:
   (a) a defined calking force has been reached; or
   (b) the calking punch has reached a defined limit position.

14. The method as claimed in claim 13, further comprising that the flange is secured in the seating bore in a positively locking manner.

15. The method as claimed in claim 13, further comprising that the flange is secured in the seating bore by friction contact.

16. The method as claimed in claim 13, further comprising that the defined limit position is defined by a limit stop that abuts the centering cone face upon reaching the limit position.

17. The method as claimed in claim 13, further comprising that the calking punch performs one continuous, inward pressing operation fixing the closing element in the seating bore.

18. The method as claimed in claim 13, further comprising that the calking punch is a sleeve-shaped flat punch that is self-centered by a cutting edge, which slides on the centering cone face before displacing the housing material.

19. The method as claimed in claim 13, further comprising the step of displacing a portion of the centering cone face.

20. A closing device for closing fluid-carrying ducts in a housing, comprising a housing with a surface and a seating bore penetrating the surface, the seating bore having a reaction face at a distance from the surface in a pre-deformed condition of the housing, and a first bore step axially between the reaction face and the surface in the pre-deformed condition, and a centering cone face extending from the first bore step to the surface in the pre-deformed condition, wherein the seating bore has a diameter diminishing with increased depth from the surface in the pre-deformed condition, a rotationally symmetrical closing element abutting the reaction face in the pre-deformed condition and a caulking site being formed on the circumference of the closing element by a plastic deformation of the housing caused by an axial force exerted on the first bore step in the pre-deformed condition, the axial force dimensioned to plastically deform the first bore step closer to the reaction face and to radially displace housing material toward the closing element, and wherein the calking site is formed by a calking punch that displaces the housing material and a centering cone face limits the axial travel of the calking punch by bearing against a corresponding conical face of the calking punch.

* * * * *